Figure 1:
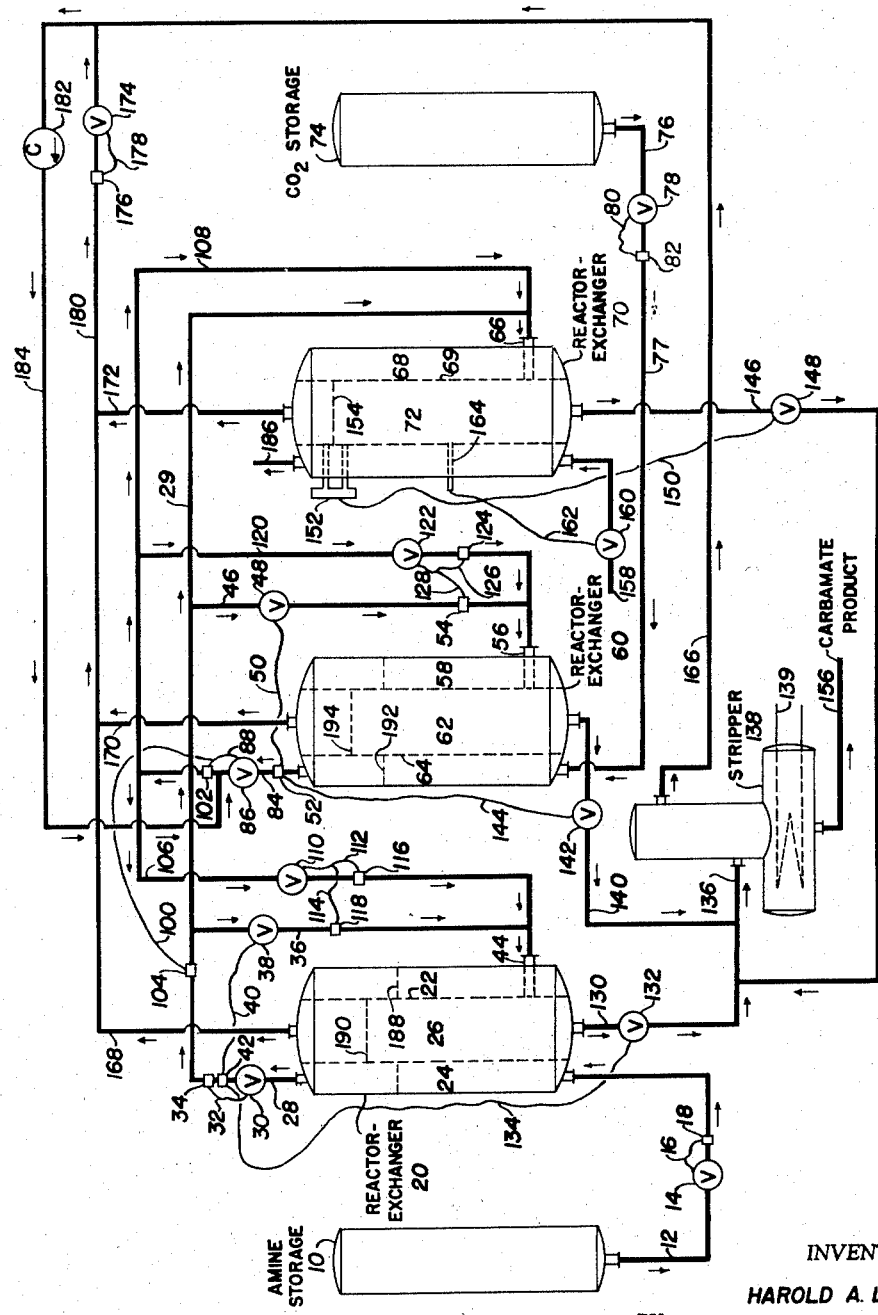

March 1, 1960  H. A. LINDAHL ET AL  2,927,128

PRODUCTION OF DIMETHYLAMMONIUM DIMETHYL CARBAMATE

Filed Dec. 30, 1957  2 Sheets-Sheet 1

FIG. I

INVENTORS.
HAROLD A. LINDAHL
HARVEY HENNIG
BY
ATTORNEY

United States Patent Office 2,927,128
Patented Mar. 1, 1960

2,927,128

PRODUCTION OF DIMETHYLAMMONIUM DIMETHYL CARBAMATE

Harold A. Lindahl, Elmhurst, and Harvey Hennig, Crystal Lake, Ill., assignors to The Pure Oil Company, Chicago, Ill., a corporation of Delaware Application December 30, 1957, Serial No. 706,143

6 Claims. (Cl. 260—501)

This invention relates to certain improvements in process technique and apparatus for conducting exothermic reactions between reactants stored at high pressures. The invention relates particularly to an improved heat exchanger system, utilizing the heat of the exothermic reaction mass, and its utilization in conjunction with a cooled-exchanger auxiliary reactor. Further, the invention facilitates the establishment of operating conditions such that the reactants remain in the gaseous phase or vapor phase and the products are in the liquid phase, thus permitting at least partial separation of unreacted reactants from the products within the reaction zone. The procedure and apparatus of this invention has been found to greatly simplify product purification.

It becomes, therefore, a primary object of this invention to provide a process for conducting exothermic reactions.

A second object of this invention is to provide an apparatus for conducting exothermic reactions.

Another object of the invention is to provide a process for effecting heat and cooling economies during exothermic reactions.

Another object of the invention is to provide an apparatus for obtaining heat and cooling economies using normally gaseous reactants which enter into exothermic reactions.

Still another object of this invention is to provide a process and apparatus for the synthesis of liquid dimethylammonium dimethyl carbamate from dimethylamine and carbon dioxide.

In accordance with this invention, it has been found that the use of heat exchangers within the reactor, wherein reactants are expanded, used as a coolant, then heated, vaporized, and combined in an exothermic reaction, allows the controlled utilization of the heat of reaction to supply the energy requirements for the reaction. Also, it has been discovered that selecting operating conditions, such that the reactants remain in the gaseous phase and the products in the liquid phase, permits at least partial separation of unreacted reactants from the product within the reaction zone and simplifies product purification. Representative of such reactions is the production of liquid dimethyl ammonium dimethyl carbamate by the reaction of gaseous carbon dioxide and dimethylamine at about atmospheric pressure. This reaction proceeds quantitatively at 45° F., but by conducting the reaction at 120–130° F. the results of this invention are obtained, that is, substantially complete separation of the gaseous reactants from the liquid product.

In accordance with this invention, the reactants, which are supplied commercially as liquids in pressurized containers, are expanded to an intermediate pressure somewhat greater than the atmospheric pressure of the reaction, and upon being expanded, the temperature drops and the liquids are at least partially vaporized. The reactants remaining in the tanks also expand and thereby undergo significant reductions in energy content. It has been found expedient to charge these reactants to the reaction zone at about 70° F., and it therefore is necessary, or at least desirable, to warm them to this temperature. At the conditions preferred for the exemplary reaction, carbon dioxide, which is supplied commercially in tanks at about 950 p.s.i.a. at 77° F., is expanded through a pressure-regulating valve to 100 p.s.i.a., and its temperature falls to about −58° F. It is then warmed to about 70° F. and again expanded, this time to reaction pressure. During this last expansion, very little change in temperature occurs. In similar fashion, dimethylamine, which is supplied commercially in tanks at 35 p.s.i.a. at about 77° F., is expanded through a first-stage, pressure-regulating valve to about 18 p.s.i.a., whereupon its temperature drops to about 57° F. It too is then warmed to about 70° F. and is subsequently reduced to atmospheric pressure for reaction.

In the instant process, the chilled reactants are separately warmed by indirect heat exchange with a portion of the reaction mass, thereby assisting in the control of reaction temperature and significantly decreasing requirements for an externally-supplied coolant. Since the energy content of the reactants remaining in the storage tanks decreases continuously because of the pressure reductions that occur in the tanks, we provide means for increasing the extent of reaction occurring in each of the reactant heaters, and thereby assure a continuous supply of reactants at constant temperatures and pressures.

Figure 2:
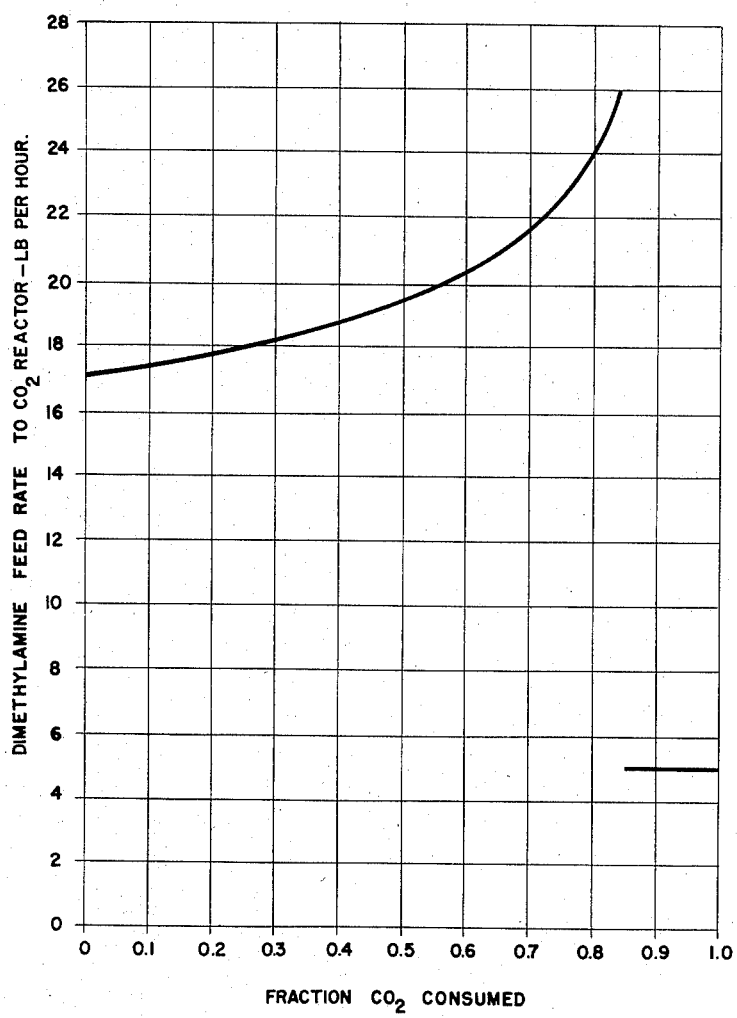

The invention is best explained by reference to the attached drawings in which,

Figure 1 is a simplified flow diagram illustrating one embodiment of the process, and Figure 2 is a graph showing the relationship of the dimethylamine feed rate to fractions of carbon dioxide consumed.

In describing the process in relation to Figure 1, typical initial flow quantities and temperatures will be referred to for the reaction of carbon dioxide and dimethylamine to form dimethylammonium dimethylcarbamate (referred to as DADC) as a non-limiting example of the invention, but it is to be understood that other reactants and operating conditions may be used to produce different products.

Referring to the flow diagram, the general relationship of the process equipment is first described. Amine storage tank 10 is connected by line 12, controlled by pressure-reducing valve 14 equipped with lead 16 and pressure-sensing element 18, to reactor-exchanger 20 which is equipped with an inner tubular wall 22 defining outer heating zone 24 and inner reaction zone 26. Line 12 connects to heating zone 24 having exit line 28 controlled by flow-control valve 30, having lead 32 connected to flow-sensing element 34. Line 28 has a first branch line 36 controlled by flow control valve 38, connected by lead 40 to temperature-sensing element 42 in line 28, leading to the bottom of reactor-exchanger 20 wherein the amine is introduced through bayonet inlet pipe 44 extending through heating zone 24 into reactor zone 26. Line 28 has a second branch line 46 controlled by flow control valve 48 equipped with lead 50 connected to temperature-sensing element 52, the function of which will be described. Branch line 46 has flow-sensing element 54 and connects to bayonet inlet 56 extending through heating zone 58 of reactor-exchanger 60 into reaction zone 62 thereof. Reactor-exchanger 60 is of the same or similar construction as reactor-exchanger 20 with inner wall 64 defining these respective enclosed zones. Line 28 connects to a third branch line 29 leading to bayonet inlet 66 passing through heating zone 68 formed by wall 69 of reactor-exchanger 70 into reaction zone 72 thereof.

Carbon dioxide storage tank 74 connects through line 76, controlled by pressure controller 78 equipped with lead 80 and pressure-sensing element 82, to line 77 and reactor-exchanger 60, entering into heating zone 58 thereof. Line 84 leading from heating zone 58 is equipped with sensing element 52 and differential flow-control valve 86 which receives signals through leads 88 and 100 connected to sensing elements 102 (in line 84) and 104 (in line 28), respectively. The flow in line 84 divides into branch lines 106, 120 and 108, the former joining line 36 and being equipped with differential flow-control 110 having leads 112 and 114 connected to sensing elements 116 and 118, respectively. Line 108 is connected to bayonet inlet 66 of reactor-exchanger 70. Branch line 120 is connected to bayonet inlet 56 of reactor-exchanger 60. Branch line 120 is equipped with differential flow-control 122 and sensing element 124. Control 122 is operated by sensing element 54 (in line 46) and sensing element 124 through leads 126 and 128.

Reaction product is removed from reactor-exchanger 20 via line 130, controlled by combination thermal-control-liquid-level control 132 connected through lead 134 to sensing element 42 in line 28, and is sent via line 136 to stripping column 138 at the bottom thereof. Stripper 138 is fitted with heating coil 139. Products from reactor-exchanger 60 proceed via line 140 and line 136 to stripper 138. Line 140 is controlled, like line 130, by combination control 142 which is connected to sensing element 52 (in line 84) by means of lead 144. Similarly, products from reactor-exchanger 70 exit via line 146 to join the combined product streams in line 136. Line 146 is controlled by valve 148 connected by means of lead 150 with liquid-level controller 152, sensitive to liquid level 154 in reactor 70. Bottoms product is removed from stripper 136 via line 156.

Water is introduced into cooling jacket 68 of reactor-exchanger 70 at line 158, controlled by thermal controller 160 connected through lead 162 to temperature-sensitive element 164, extending into reactor zone 72. Stripped, unused reactants, consisting mainly of carbon dioxide, from stripper 136 leave by overhead line 166, are joined by overhead vapors from each of the reaction zones 26, 62 and 72 drawn off by branch lines 168, 170 and 172, these combined branch streams passing through pressure controller 174, operated by means of sensing element 176 through lead 178, in line 180. This total recycle stream continues through compressor 182 into line 184, which connects back to line 84 for recycle into the system. Line 186 is the coolant exit for cooling zone 68. Liquid levels are shown at 188, 190, 192, 194 in reactors 20 and 60.

With reference to the drawing, the general processing steps are: liquid dimethylamine at an initial storage pressure of 35 p.s.i.a. and a temperature of 77° F. is withdrawn from storage tank 10 through line 12 to pressure-reducing valve 14. At valve 14, the pressure is reduced to a constant level of 18 p.s.i.a. and the expanded, partially vaporized dimethylamine flows through line 12 to heating zone 24 of reactor-exchanger 20. The dimethylamine entering zone 24 is heated by indirect exchange of the exothermic heat of reaction and heat of condensation from reaction zone 26, and leaves zone 24 through line 28, the rate of flow being controlled by means of flow-control valve 30. The dimethylamine then continues through line 28 to branch lines 36, 46 and 29 into reaction zones 26, 62 and 72, the flow through line 36 being controlled by valve 38 which regulates the amount of dimethylamine flowing to reaction zone 26 so that the vaporized dimethylamine flowing through line 28 is maintained at about 70° F.

Carbon dioxide at an initial storage pressure of 950 p.s.i.a. and a temperature of 70° F. is withdrawn from storage tank 74 through line 76 to pressure-reducing valve 78. Valve 78 maintains a constant reduced pressure of 100 p.s.i.a. on line 77 through which the expanded mixture of liquid and gaseous carbon dioxide flows to heating zone 58 of reactor-exchanger 60. A reduction to lower pressures cause the formation of solid carbon dioxide which plugs the line. The chilled carbon dioxide enters zone 58 at about −58° F. and is warmed to 70° F. by indirect exchange with the exothermic heat of reaction and heat of condensation from reaction zone 62. The warmed, vaporized carbon dioxide leaves zone 58 via line 84 and passes through differential flow-control valve 86 which maintains the flow of carbon dioxide in fixed relationship to the flow of dimethylamine through line 28 by means of sensing element 104. In general, the flow of carbon dioxide is maintained by valve 86 at a rate which provides a 10% excess over the theoretical stoichiometric amount required to react with the dimethylamine. The carbon dioxide flows from valve 86 through line 84 to branch lines 106, 120, and 108, the quantity flowing through line 106 being controlled by valve 110 to a 10% excess over the amount required to react with the quantity of dimethylamine flowing through control valve 98.

As mentioned above, the energy content of the dimethylamine remaining in storage tank 10 continuously decreases as a result of the decrease in tank pressure, and it is therefore necessary to provide increasingly greater amounts of heat in reactor-exchanger 20. Consequently, control valve 38, actuated by the temperature of the warmed amine flowing through line 28, admits continuously greater amounts of dimethylamine to reaction zone 26, and valve 110 admits more carbon dioxide, thereby providing more reaction and heat of reaction in reactor-exchanger 20. As will be seen hereinafter, reactor-exchanger 60, in which the expanded carbon dioxide is warmed, is operated in similar fashion.

The amount of dimethylamine flowing through branch line 46 to reaction zone 62 of reactor 60 is regulated by control valve 48 so that the heat of reaction in zone 62 is sufficient to raise the carbon dioxide temperature to 70° F., and the amount of carbon dioxide flowing through branch line 120 is regulated by differential flow-control valve 122 in fixed relation (10% excess over stoichiometric amount) to the amount of dimethylamine flowing through line 46. Since the energy content of the carbon dioxide remaining in storage tank 74 is continuously decreasing, the quantities of dimethylamine and carbon dioxide flowing to reaction zone 62 are continuously increased as just described for reactor-exchanger 20.

The continuously decreasing amounts of amine and carbon dioxide that remain after the demands of reactor-exchangers 20 and 60 have been satisfied are conducted through lines 29 and 108, respectively, to zone 72 of reactor-exchanger 70. The exothermic heat of reaction and heat of condensation from reaction zone 72 is removed by indirect heat exchange with cooling water flowing through zone 68. Cooling water enters via line 158, the flow being controlled by valve 160 to maintain the desired reaction temperature in zone 72, and leaves through line 186.

Liquid dimethylammonium dimethylcarbamate (DADC) is withdrawn from the bottom of reaction zones 26, 62, and 72 through lines 130, 140 and 146, respectively. Levels in these reactors are regulated by means of valves 132, 142, and 148 so that sufficient heat transfer surface of partitions 22, 64 and 69 is covered in the reaction zones to permit transfer of the required amount of heat. The DADC flowing through lines 130, 140 and 146 is combined in stream 136 and transferred to stripper 138, wherein dissolved and entrained carbon dioxide is removed for recycle through line 166, compressor 182, and line 184 to join line 84. Unconsumed carbon dioxide is withdrawn from the reaction zones through lines 168, 170, and 172 which join to form stream 180. This stream joins line 166 through which the total recycle carbon dioxide passes to compressor 182. Pressure can be maintained on all of the reaction zones by means of control valve 174 in line 180.

As mentioned previously, the energy content of the liquid reactants being withdrawn from the storage tanks constantly decreased because of the pressure reduction which occurs in the tanks. However, when all of the liquid phases have been withdrawn, significant amounts of gaseous reactants remain in the tanks. These gaseous reactants are much higher in energy content than are the liquid phases, so heating requirements in reactor-exchangers 20 and 60 drop very rapidly when the expanded reactants entering the exchange zones become entirely gaseous. This is illustrated in graphical form in Figure 2 where it is seen that at initial conditions the carbon dioxide flowing through zone 58 of reactor-exchanger 60 can be warmed to 70° F. by reacting dimethylamine at a rate of about 17.4 pounds per hour, for the particular plant capacity of this example, in reaction zone 62. When about 84% of the carbon dioxide has been withdrawn from the storage tank, dimethylamine must be reacted at a rate of about 26 pounds per hour. This is the point at which the last drop of liquid carbon dioxide leaves the storage tank. Immediately thereafter, gaseous carbon dioxide flows from the tank, and dimethylamine must be reacted at a rate of only about 5.4 pounds per hour in reaction zone 62. Since the dimethylamine is initially at a much lower pressure, the change in energy content is not as significant, but must be adequately compensated. The instant process is ideally suited to such variations, and permits simple mechanical operation.

If the reactants are available at a constant supply pressure rather than a constantly decreasing pressure, obvious simplifications in control mechanisms can be made. In such situations, flows to all of the reactors can be maintained constant, but our process still provides economies in coolant requirements and smoother mechanical operation.

As mentioned above, our process can be adapted to a number of chemical reactions, of which the production of dimethylammonium dimethylcarbamate is merely exemplary.

The exchanger-reactors may be of any suitable design. For example, the reaction zones may consist of fin-walled heat-exchanger tubes and the jacket may be cylindrical. Preferably, suitable baffles are contained within the reaction zones to assure intimate mixing of the reactants. Other alternative mechanical arrangements are also contemplated within the scope of our invention.

In order to further demonstrate the invention the following specific example is given:

Liquid dimethylamine is withdrawn from storage tank 10 at a rate of 246 lb./hr. through line 12 to pressure-reducing valve 14. The initial pressure and temperature conditions of storage tank 10 are 35 p.s.i.a. and 77° F. At valve 14, the dimethylamine is flashed to constant conditions of 18 p.s.i.a. and 57° F., and the resultant vapor-liquid mixture continues through line 12 to heating zone 24 of reactor-exchanger 20. The dimethylamine entering zone 24 is heated by indirect exchange of the exothermic heat of reaction and heat of condensation from reaction zone 26, and leaves zone 24 through line 28; the rate of flow being controlled by means of flow-control valve 30. The heated dimethylamine then flows through line 28 to branch lines 36, 46 and 29. The flow through line 36 is controlled by valve 38 which regulates the amount flowing to reaction zone 26, so that the amount of reaction in zone 26 is sufficient to maintain the temperature of vaporized dimethylamine flowing through line 12 at 70° F. The initial rates of dimethylamine flow through branch lines 36, 46 and 29, are 155.7, 16.4 and 73.7 lb./hr., respectively Carbon dioxide, at an initial storage pressure of 950 p.s.i.a. and a temperature of 77° F., is withdrawn from storage tank 74 at a rate of 120 lb./hr. through line 76 to pressure-reducing valve 78. Valve 78 maintains a constant reduced pressure of 100 p.s.i.a. and a temperature of −58° F. in line 77. A reduction to lower pressures would cause the formation of solid carbon dioxide which would plug the lines. The expanded, vapor-liquid carbon dioxide mixture flows to heating zone 58 of reactor-exchanger 60. The carbon dioxide enters zone 58 at about −58° F. and is heated to 70° F. by indirect exchange with the exothermic heat of reaction and heat of condensation from reaction zone 62. The heated, vaporized carbon dioxide leaves zone 58 via line 84 and passes through differential flow-control valve 86. Valve 86 maintains the flow of carbon dioxide in fixed relationship to the flow of dimethylamine through line 28. The carbon dioxide flows from valve 86 to reaction zones 26, 62 and 72 through branch lines 106, 120 and 108. The initial carbon dioxide flow rates through these branch lines are 92.4, 9.6, and 42.9 lb./hr., respectively. These carbon dioxide rates are about twenty percent in excess over the stoichiometric amount required to react with the amount of dimethylamine flowing to each of the respective reactors.

Since the energy content of the carbon dioxide and dimethylamine remaining in storage tanks 10 and 74 continually decreases as a result of the decrease in tank pressure, it is necessary to provide increasingly greater amounts of heat in reactor exchangers 20 and 60. This is accomplished by charging increasingly greater amounts of reactants to these reactors and correspondingly decreasing the reactant flows to the swing reactor 70.

The amount of dimethylamine flowing through branch line 46 to reaction zone 62 of reactor 60 is regulated by control valve 48 so that the total heat of reaction and condensation is sufficient to raise the carbon dioxide temperature to 70° F. The amount of carbon dioxide flowing through branch line 120 is regulated by differential flow-control valve 122 in fixed relation (20% excess over stoichiometric amount) to the amount of dimethylamine flowing through line 46 to reaction zone 62. The amount of dimethylamine flowing through line 46 to reaction zone 62 is continually increased from an initial 16.4 lb./hr. to 26 lb./hr. when 84 percent of the carbon dioxide initially stored in tank 74 is consumed. The corresponding increase in carbon dioxide rate through line 46 to reactor zone 62 is from 9.6 to 15.3 lb./hr. The dimethylamine feed rate through line 46, as a function of the fraction of carbon dioxide consumed, is given in Figure 2.

The dimethylamine rate through line 36 to reaction zone 26 is controlled by valve 38, which is actuated by the temperature of the heated amine flowing through line 28. As the temperautre of the dimethylamine in line 28 tends to decrease, valve 38 admits more dimethylamine, and differential flow control valve 110 admits more carbon dioxide to zone 26, thereby providing more reaction and heat of reaction in reactor-exchanger 20. The dimethylamine feed rate through line 36 increases from an initial 155.7 lb./hr. to 165.7 lb./hr. when 98 percent of the amine initially present in tank 10 is consumed. The corresponding change in carbon dioxide rate through line 106 is from 92.4 to 98.1 lb./hr.

The continuously decreasing amounts of amine and carbon dixoide that remain after the demands of reactor-exchangers 20 and 60 have been satisfied are conducted through lines 29 and 108, respectively, to reactor-exchanger 70. The initial dimethylamine flow through line 29 of 72.9 lb./hr. is continually decreased to a minimum of 53.3 lb./hr. The initial flow of carbon dioxide of 42.9 lb./hr. is correspondingly reduced to a minimum of 31.5 lb./hr.; the exothermic heat of reaction and heat of condensation from reaction zone 72 are removed by indirect heat exchange with cooling water flowing through zone 68. Cooling water enters via line 158, the flow being controlled by valve 160 to maintain a reaction temperature of 125° F. in zone 72, and leaves through line 186.

Liquid dimethylammonium dimethylcarbamate is withdrawn at a temperature about 125° F. from reaction zones 26, 62 and 72 through lines 130, 140 and 146, respectively. The initial product rates of 232 lb./hr. and 24.4 lb./hr. through lines 130 and 140, respectively, continually increase to 246 and 38.9 lb./hr. as the dimethylamine and carbon dioxide tanks become depleted. The corresponding decrease in produce rate through line 146 is from 109.1 lb./hr. to 81.1 lb./hr. Levels in these reactors are regulated by means of valves 132, 142 and 148 so that sufficient heat-transfer surface at partition walls 22, 64 and 69 is covered in the reaction zones to permit transfer of the required amounts of heat. The DADC flowing through lines 130, 140 and 146, is combined in stream 136 and transferred to stripper 138, wherein dissolved and entrained carbon dioxide is removed for recycle through line 166, compressor 182, and line 184 to join line 84. Unconsumed carbon dioxide is withdrawn from the top of the reaction zones at initial rates of 14.8, 1.4, and 6.2 lb./hr. through lines 168, 170 and 172, respectively, which join to form stream 180. This stream joins line 166 through which total recycle carbon dioxide passes to compressor 182. Pressure can be maintained on all of the reaction zones by means of control valve 174 in line 180.

When all of the liquid phase has been withdrawn from each of the reactant storage tanks, significant amounts of gaseous reactants remain in the tanks. The gaseous reactants are much higher in energy content than are the liquid phases, so the heating requirements in reactor-exchangers 20 and 60 drop very rapidly when the expanded reactants entering the exchange zones become entirely gaseous. The last 16 percent of the carbon dioxide in storage tank 74 is in the vapor state. At this point, the dimethylamine rate to zone 62 of reactor-exchanger 60 must be reduced from 26 to 5.4 lb./hr. The corresponding reduction in carbon dioxide flow through line 120 to zone 62 is from 15.3 to 2.9 lb./hr. The difference in the amine and carbon dioxide flows is directed through lines 29 and 108, respectively, to reaction zone 72. The DADC product rate is correspondingly reduced to 7.9 lb./hr. in line 140 and increased to 112 lb./hr. in line 146. Since the dimethylamine is contained initially at a much lower pressure, only 1 to 2% of the amine is removed as a vapor. The reactants' flows must be similarly compensated for the change in energy content between amine vapor and liquid, but the amount of amine vapor flow is too small to be of significance.

As mentioned, our process can be adopted to a number of chemical reactions, of which the production of dimethylammonium dimethylcarbamate is merely exemplary, and is not to be considered limiting. Other similar reactions, as defined herein, can also be advantageously conducted in our process. The only limitations attaching to the present invention appear in the appended claims.

What is claimed is:

1. In the process of reacting dimethylamine and carbon dioxide exothermically to form liquid dimethylammonium dimethylcarbamate wherein said reactants are maintained in separate sources in liquid form under pressure and are conducted to separate reaction zones the improvement comprising expanding and cooling said dimethylamine and carbon dioxide separately, conducting said cooled dimethylamine in indirect heat exchange relationship with a first exothermic reaction zone containing a controlled level of liquid dimethylammonium dimethylcarbamate maintained at a temperature of about 120° to 130° F. by said heat exchange, conducting said cooled carbon dioxide in indirect heat exchange relationship with a second exothermic reaction zone containing a controlled level of liquid dimethylammonium dimethylcarbamate maintained at a temperature of about 120° to 130° F. by said heat exchange, withdrawing heated and expanded dimethylamine and carbon dioxide from said heat exchange steps, conducting portions of said withdrawn dimethylamine and carbon dioxide into admixture into said first and second reaction zones, controlling the rate of input of said mixtures to maintain said reaction zone temperatures, regulating the amount of said heat exchange relationship in each of said reaction zones to provide sufficient heat to bring said dimethylamine and carbon dioxide to reaction temperature, and gradually increasing the amount of heat and heat exchange from said first and second reaction zones by increase in said rate of introduction of said reactants into said reaction zones as the pressure on said reactants and said separate sources is diminished.

2. The process of producing dimethylammonium dimethylcarbamate which comprises maintaining a pressurized source of liquid dimethylamine and a pressurized source of liquid carbon dioxide, separately expanding said dimethylamine in heat exchange relationship in a cooling zone within a first reaction zone maintained at about 75° to 85° F. above normal reaction temperature, separately expanding said carbon dioxide in heat exchange relationship in a second cooling zone within a second reaction zone maintained at about 75° to 85° F. above normal reaction temperature, withdrawing gaseous dimethylamine and gaseous carbon dioxide from said cooling zones, conducting portions of gaseous dimethylamine and carbon dioxide in admixture to said first and second reaction zones, controlling the rate of input of said dimethylamine and carbon dioxide to said reaction zones to thereby control the heat of reaction in said zones at a level sufficient to vaporize said dimethylamine and carbon dioxide in said cooling zones, gradually increasing the rate of input of said reactants to said separate reaction zones as the expansion pressure of said reactants in said pressurized sources decreases, conducting decreasing amounts of unreacted dimethylamine and carbon dioxide in admixture to a third reaction zone, and recovering dimethylammonium dimethylcarbamate from said reaction zones.

3. The process in accordance with claim 2 in which unreacted dimethylamine and carbon dioxide are removed from said reaction zones, and are compressed for recycle thereto along with unreacted dimethylamine and carbon dioxide taken from said product.

4. The process in accordance with claim 2 in which said reaction is conducted at a temperature of about 120° to 130° F., the reaction product is continuously separated as a liquid phase, and the unreacted dimethylamine and carbon dioxide are continuously separated as gaseous phases from said reaction zones.

5. The process of preparing dimethyl ammonium dimethyl carbamate which comprises maintaining a supply of dimethylamine at a pressure of about 35 p.s.i.a. and a temperature of about 77° F., maintaining a supply of carbon dioxide at a pressure of about 950 p.s.i.a. and a temperature of about 77° F., allowing said dimethylamine to expand whereby a mixture of liquid and gaseous dimethylamine is formed at a pressure of about 18 p.s.i.a. and a temperature of about 57° F., conducting said mixture in indirect heat exchange relationship with a first reaction zone, allowing said carbon dioxide to expand whereby a mixture of liquid and gaseous carbon dioxide is formed at a pressure of about 100 p.s.i.a. and a temperature of about −58° F., conducting said mixture in indirect heat exchange relationship with a second reaction zone, conducting a mixture of dimethylamine and carbon dioxide in at least stoichiometric proportions to said first and second reaction zones whereby an exothermic reaction is developed at a temperature of about 120° to 130° F., continuously utilizing the heat of said reaction to produce additional quantities of said dimethylamine and carbon dioxide in vapor form at atmospheric pressure and at a temperature of about 70° F., continuously conducting said additional quantities of dimethylamine and carbon dioxide to each of said reaction zones; removing dimethyl ammonium dimethyl carbamate from said reaction zones, separating unreacted dimethylamine and carbon dioxide therefrom, in a separation zone, removing unreacted dimethylamine and carbon dioxide from said reaction zones, combining the aforementioned unreacted reactants, compressing the unreacted reactants, recycling same to said reaction zones, gradually increasing the rate of input of reactants to said first and second zones as the pressures of the reactant sources diminish and the energy contents thereof lower to raise the heat input into said reactants proportionately, conducting the balance of reactants to a third reaction zone, controlling the temperature in said third reaction zone at a level sufficient to consume a major portion of said reactants, removing dimethylammonium dimethylcarbamate product from said third reaction zone, conducting said last mentioned product to said separation zone and continuing said process until the pressurized sources of said reactants are exhausted.

6. The process in accordance with claim 5 in which the rates of flow of dimethylamine to said first, second and third reaction zones are initially about 155 lb./hr., 16 lb./hr. and 73 lb./hr. respectively and the initial rates of flow of said carbon dioxide to said first, second and third reaction zones are initially about 92 lb./hr., 9.6 lb./hr. and 42 lbs. per hour respectively, continually increasing the input of dimethylamine to said second reaction zone to about 26 lb./hr. when the liquid phase in said carbon dioxide source is substantially consumed while simultaneously increasing the input of carbon dioxide to said second reaction zone in fixed proportion thereto.

References Cited in the file of this patent

UNITED STATES PATENTS

| | | |
|---|---|---|
| 2,010,841 | Bender | Aug. 13, 1935 |
| 2,139,351 | Bejarano | Dec. 6, 1938 |
| 2,154,795 | Westenberg | Apr. 18, 1939 |
| 2,635,124 | Hunter et al. | Apr. 14, 1953 |